(12) United States Patent
Ishikawa et al.

(10) Patent No.: US 7,215,508 B2
(45) Date of Patent: May 8, 2007

(54) CERAMIC DYNAMIC-PRESSURE BEARING AND HARD DISK DRIVE USING THE SAME

(75) Inventors: Hironobu Ishikawa, Aichi (JP); Atsutoshi Sugiyama, Gifu (JP)

(73) Assignee: NGK Spark Plug Co., Ltd., Aichi (JP)

( * ) Notice: Subject to any disclaimer, the term of this patent is extended or adjusted under 35 U.S.C. 154(b) by 76 days.

(21) Appl. No.: 10/090,267

(22) Filed: Mar. 7, 2002

(65) Prior Publication Data

US 2003/0053250 A1    Mar. 20, 2003

(30) Foreign Application Priority Data

Mar. 8, 2001    (JP)    ............... 2001-065591

(51) Int. Cl.
*G11B 17/02*    (2006.01)

(52) U.S. Cl. .................................. 360/99.08

(58) Field of Classification Search ............. 360/99.08
See application file for complete search history.

(56) References Cited

U.S. PATENT DOCUMENTS

| | | | |
|---|---|---|---|
| 3,284,144 A | | 11/1966 | Moore et al. |
| 5,283,491 A | * | 2/1994 | Jabbar et al. .................. 310/90 |
| 5,447,894 A | | 9/1995 | Yasuoka et al. |
| 5,688,053 A | * | 11/1997 | Itoh et al. .................... 384/100 |
| 5,969,448 A | * | 10/1999 | Liu et al. ...................... 310/90 |
| 6,362,932 B1 | * | 3/2002 | Bodmer et al. .......... 360/99.08 |

FOREIGN PATENT DOCUMENTS

| | | |
|---|---|---|
| EP | 0732517 B1 | 12/2001 |
| JP | 63-92915 | 4/1988 |
| JP | 3-85715 | 8/1991 |
| JP | 5-106635 | 4/1993 |

(Continued)

OTHER PUBLICATIONS

NIST, NIST Property Data Summaries, Feb. 8, 2001.*

(Continued)

*Primary Examiner*—David Davis
(74) *Attorney, Agent, or Firm*—Sughrue Mion, PLLC

(57) ABSTRACT

A ceramic dynamic-pressure bearing includes a first member 14 having a cylindrical outer surface and a second member 15 having a cylindrical reception hole formed therein. The first member 14 is inserted into the reception hole. A radial dynamic-pressure gap is formed between the inner surface of the reception hole of the second member 15 and the outer circumferential surface of the first member 14. The first member 14 and the second member 15 are formed of an alumina ceramic which contains an Al component in an amount of 90–99.5% by mass as reduced to $Al_2O_3$ and an oxide-type sintering aid component in an amount of 0.5–10% by mass as reduced to an oxide thereof. The thrust dynamic-pressure gap definition surface of the second member which faces the thrust plate has a flatness of not greater than 3 μm or the thrust dynamic-pressure gap definition surface of the thrust plate which faces the second member has a flatness of not greater than 3 μm. Also disclosed is a hard disk drive having a motor including a motor rotation output section having the ceramic dynamic-pressure bearing.

42 Claims, 7 Drawing Sheets

FOREIGN PATENT DOCUMENTS

| | | |
|---|---|---|
| JP | 5-187436 | 7/1993 |
| JP | 6-60404 | 8/1994 |
| JP | 7-237961 A | 9/1995 |
| JP | 7-259849 | 10/1995 |
| JP | 7-277814 A | 10/1995 |
| JP | 10-213125 A | 8/1998 |
| JP | 10-306827 | 11/1998 |
| JP | 2000-120664 A | 4/2000 |
| JP | 2000-240642 A | 9/2000 |

OTHER PUBLICATIONS

NIST, NIST Property Data Summaries, NIST, Feb. 8, 2001.*

* cited by examiner

CERAMIC DYNAMIC-PRESSURE BEARING $$d = \frac{dmax + dmin}{2}$$

Fig. 8

CERAMIC DYNAMIC-PRESSURE BEARING AND HARD DISK DRIVE USING THE SAME

BACKGROUND OF THE INVENTION

1. Field of the Invention

The present invention relates to a ceramic dynamic-pressure bearing and a hard disk drive using the same.

2. Description of the Related Art

Conventionally, a ball bearing has often been used as a bearing for the shaft of a motor serving as a drive unit of electric equipment. High-speed rotation of a motor has been rapidly implemented in a hard disk drive, which is a peripheral component of a computer. In this regard, in order to obtain excellent bearing performance with low rotation-speed fluctuation and reduced noise and vibration, or in order to elongate bearing service life, a dynamic-pressure bearing, which uses a fluid, such as air, as a medium, has been employed. The dynamic-pressure bearing operates in the following manner: when, for example, a spindle and a bearing member disposed so as to surround the spindle undergo relative rotation about an axis, the axis of rotation is supported by the action of fluid dynamic-pressure generated in the gap formed between the outer circumferential surface of the spindle and the inner circumferential surface of the bearing member. Further, a certain other bearing is configured such that the thrust face of a spindle or that of a bearing member is supported by action of dynamic pressure through disposition of a thrust plate.

When a dynamic-pressure bearing is in a high-speed rotation state, in which generated dynamic-pressure is sufficiently high, two members which face each other with a dynamic-pressure gap present therebetween do not come into contact with each other. However, at the time of starting or stopping, when rotational speed is low, sufficiently high dynamic pressure is not generated; thus, the two members come into contact with each other. Component members of such a dynamic-pressure bearing have generally been formed of a metal, such as stainless steel, and in some cases have been further coated with resin or a like material. However, two metallic members may involve a problem of wear or seize-up caused by mutual contact thereof at the time of starting or stopping. In order to prevent the problem, coating a metallic member with a lubricating layer, such as a resin layer, at a portion facing the dynamic-pressure gap has been proposed, resulting in a failure to yield sufficient effect. In order to attain sufficient endurance against wear and seize-up, either or both of two members, such as either or both of the spindle and the bearing member described above, which face each other with a dynamic-pressure gap present therebetween have been formed of a ceramic, such as alumina.

3. Problems to be Solved by the Invention

However, in the case of a hard disk drive which employs a dynamic-pressure bearing configured such that support in the thrust direction is effected by action of dynamic pressure through use of a thrust plate, despite use of ceramic components, a problem arises in that, when a second member and a thrust plate come into contact with each other at the time of starting or stopping, wear or linking (a phenomenon such that two members come into close contact due to vacuum created in the clearance therebetween) occurs, or an increase in starting torque disables starting of rotation. Also, such a hard disk drive has involved a problem in that vibration occurs during rotation of the dynamic-pressure bearing, with resultant unstable rotation.

SUMMARY OF THE INVENTION

It is therefor an object of the present invention to provide a ceramic dynamic-pressure bearing and a hard disk drive equipped with a ceramic dynamic-pressure bearing which is not prone to occurrence of wear or a like problem on a thrust plate at the time of starting, stopping, or a like operation mode and which can realize stable rotation with little vibration.

In order to achieve the above-described object, the present invention provides a ceramic dynamic-pressure bearing comprising:

a first member formed of ceramic and having a cylindrical outer surface, a second member formed of ceramic and having a cylindrical reception hole formed therein, the first member being inserted into the reception hole of the second member in such a manner as to be rotatable, relative to the second member, about an axis, and a thrust plate formed of ceramic and disposed in such a manner as to face at least one end face of the second member as viewed along the axis of rotation, the end face of the second member and a face of the thrust plate in opposition to the end face serving as thrust dynamic-pressure gap definition surfaces so as to define a thrust dynamic-pressure gap therebetween; and the ceramic dynamic-pressure bearing satisfies at least one of the following requirements (i) to (vi):

(i) the thrust dynamic-pressure gap definition surface of the second member which faces the thrust plate has a flatness of not greater than 3 μm;

(ii) the thrust dynamic-pressure gap definition surface of the thrust plate which faces the second member has a flatness of not greater than 3 μm;

(iii) the thrust dynamic-pressure gap definition surface of the second member which faces the thrust plate and the thrust dynamic-pressure gap definition surface of the thrust plate which faces the second member have a total flatness of not greater than 3 μm;

(iv) the thrust dynamic-pressure gap definition surface of the second member which faces the thrust plate is crowned such that an inner circumferential portion thereof projects by an amount greater than 0 μm and not greater than 2.5 μm with respect to an outermost circumferential portion thereof;

(v) the thrust dynamic-pressure gap definition surface of the thrust plate which faces the second member is crowned such that an inner circumferential portion thereof projects by an amount greater than 0 μm and not greater than 2.5 μm with respect to an outermost circumferential portion thereof; and (vi) a clearance between the mutually facing thrust dynamic-pressure gap definition surfaces of the second member and the thrust plate is greater than 0 μm and not greater than 2.5 μm as measured at outermost circumferential portions of the thrust dynamic-pressure gap definition surfaces.

The above object of the present invention is also achieved by providing a hard disk drive comprising a motor including a motor rotation output section having the ceramic dynamic-pressure bearing.

Notably, flatness mentioned in the present invention denotes that specified in item 2 in "Attached Table" in JIS B0021 (1984). In the ceramic dynamic-pressure bearing of the present invention, the ceramic dynamic-pressure bearing yields the following effects by fulfilling the respective requirements (i) to (vi) mentioned above.

(i) When the thrust dynamic-pressure gap definition surface of the second member which faces the thrust plate has a flatness of not greater than 3 μm, during rotation of the second member, the clearance between the thrust plate and the end face of the second member becomes constant along the circumferential direction, whereby variations in generated dynamic pressure are reduced in the course of rotation. As a result, rotation of the dynamic-pressure bearing and thus that of the hard disk can be stabilized. Therefore, the hard disk drive can implement high-speed disk rotation and high reliability, thereby drastically enhancing data access speed and data read/write accuracy. Since vibration during rotation can be prevented, breakage of a ceramic member can be prevented, such as the second member, which would otherwise result from contact with a peripheral member. In the case where the opposite end faces of the second member serve as thrust dynamic-pressure gap definition surfaces and face corresponding thrust plates, preferably, not only the thrust dynamic-pressure gap definition surface at one end but also that at the other end satisfies the above-described requirement for flatness of the thrust dynamic-pressure gap definition surface of the second member.

(ii) When the thrust dynamic-pressure gap definition surface of the thrust plate which faces the second member has a flatness of not greater than 3 μm, during rotation of the second member, the clearance between the thrust plate and the end face of the second member becomes constant along the circumferential direction, whereby variations in generated dynamic pressure are reduced in the course of rotation. Therefore, vibration of the second member can be prevented, thereby stabilizing rotation of the dynamic-pressure bearing. As a result, the hard disk drive can implement high-speed disk rotation and high reliability, thereby drastically enhancing data access speed and data read/write accuracy. Since vibration of the second member can be prevented, breakage of a ceramic member can be prevented, such as the second member, which would otherwise result from contact with a peripheral member. In the case where the opposite end faces of the second member serve as thrust dynamic-pressure gap definition surfaces and face corresponding thrust plates, preferably, not only the thrust dynamic-pressure gap definition surface of one thrust plate but also that of the other thrust plate satisfies the above-described requirement for flatness of the thrust dynamic-pressure gap definition surface of the thrust plate.

(iii) This requirement specifies the relationship of flatness between the mutually facing thrust dynamic-pressure gap definition surfaces of the second member and the thrust plate. When the total flatness of the two thrust dynamic-pressure gap definition surfaces is not greater than 3 μm, vibration of the second member can be prevented as in the case of (i) and (ii), thereby preventing potential breakage of ceramic.

(iv) Since the thrust dynamic-pressure gap definition surface of the second member which faces the thrust plate is crowned such that an inner circumferential portion thereof projects by an amount greater than 0 μm and not greater than 2.5 μm with respect to an outermost circumferential portion thereof, occurrence of linking and adhesion wear can be prevented at the time of starting or stopping, thereby preventing potential breakage of ceramic. Since the distance between the second member and the thrust plate as measured at an outermost circumferential portion of the second member is greater, within a predetermined range, than that measured at an inner circumferential portion of the second member, even when the second member rests on the lower thrust plate at the time of starting or stopping, the outermost circumferential portion of the second member is unlikely to come into contact with the thrust plate. Therefore, at the time of starting, the dynamic-pressure bearing starts rotating smoothly without linking and adhesion wear; and at the time of stopping, the dynamic-pressure bearing is free from abrupt stops, which would otherwise result from linking and adhesion wear caused by close contact between the outermost circumferential portion of the second member and the thrust plate.

When the amount of crowning is in excess of 2.5 μm, generation of dynamic pressure becomes unstable, and vibration increases, which is undesirable (this applies to the description below). When the thrust dynamic-pressure gap definition surface for generating dynamic pressure is formed on opposite sides (upper and lower sides) of the second member as viewed along the thickness direction of the second member (as viewed along the axis of rotation), preferably, not only the thrust dynamic-pressure gap definition surface on one side (particularly on the lower side) but also that on the other side satisfies the above-described requirement for crowning dimension.

(v) Since the thrust dynamic-pressure gap definition surface of the thrust plate which faces the second member is crowned such that an inner circumferential portion thereof projects by an amount greater than 0 μm and not greater than 2.5 μm with respect to an outermost circumferential portion thereof, occurrence of linking and adhesion wear can be prevented at the time of starting or stopping as in the case of (iv), thereby preventing potential breakage of ceramic. In the case where the opposite end faces of the second member serve as thrust dynamic-pressure gap definition surfaces and face corresponding thrust plates, preferably, not only the thrust dynamic-pressure gap definition surface of one thrust plate but also that of the other thrust plate satisfies the above-described requirement for crowning dimension.

(vi) This requirement specifies the clearance between the mutually facing thrust dynamic-pressure gap definition surfaces of the second member and the thrust plate measured at outermost circumferential portions of the thrust dynamic-pressure gap definition surfaces. Employing a clearance of greater than 0 μm and not greater than 2.5 μm yields the effect of restraining linking and adhesion wear at the time of starting or stopping and the effect of preventing potential breakage of ceramic, as in the case of (iv) and (v).

Notably, any one of the above-described requirements (i) to (iii) can be combined with any one of the requirements (iv) to (vi). A configuration which satisfies such combined requirements yields a further enhanced effect of preventing potential damage of ceramic by virtue of a synergistic effect obtained by conforming to the combined requirements in relation to rotation of the dynamic-pressure bearing.

In order to increase dynamic pressure to be generated so as to realize rotation accuracy of enhanced stability, preferably, the inner surface of the reception hole of the second member and the outer circumferential surface of the first member to be received inside the inner surface serve as radial dynamic-pressure gap definition surfaces, which define a radial dynamic-pressure gap therebetween.

Next, the thrust plate can be fixed while being placed on, for example, an end face of the first member. In this case, the thrust plate is fixed such that a bolt is disposed to extend through the first member and the thrust plate, which is placed on the first member, while an end portion of the bolt projecting from the thrust plate is screw-engaged with a female-threaded portion of a relevant member. In this case, when, as a result of engagement, the thrust plate is warped concavely toward an end face of the second member which faces the thrust plate, an outer edge portion of the thrust plate may come into contact with the end face of the second member, potentially causing galling. Such galling may impair surface accuracy of the end face of the second member, potentially disabling stable generation of dynamic pressure. When the contact pressure is high, a start-up torque of a motor increases excessively, potentially shortening motor life due to overload. In the worst case, motor start-up may be disabled.

In order to alleviate such problems, preferably, the thrust dynamic-pressure gap definition surface of the thrust plate has a lower hardness than the thrust dynamic-pressure gap definition surface of the second member. As a result, even when the above-mentioned contact occurs, an outer edge portion of the thrust plate is worn appropriately, whereby intense galling becomes unlikely to occur on the end face of the second member. The wear of the thrust plate reduces contact pressure to thereby prevent excessive motor start-up torque.

Hardness can be differentiated between the ceramic used to form the thrust plate and the ceramic used to form the second member, by the following methods.

(i) The thrust plate is formed of a ceramic whose main phase has a hardness substantially lower than that of the main phase of a ceramic used to form the second member. For example, the second member may be formed of a ceramic whose main phase is silicon nitride or zirconia, whereas the thrust plate may be formed of a ceramic whose main phase is alumina.

(ii) When the same inorganic compound (e.g., alumina) is employed as the main phase of the ceramic, the grain boundary phase (sintering aid) content of the ceramic used to form the thrust plate is increased. Alternatively, the density of the ceramic used to form the thrust plate is lowered. Further, the average grain size of the main phase of a ceramic used to form the thrust plate is increased.

Next, when the first member, the second member, or the thrust plate is to be formed of alumina ceramic, preferably, the alumina content of the ceramic is adjusted to 90–99.5% by mass to attain machining accuracy for fulfilling the above-described requirements (i) to (vi).

The alumina content is adjusted to the above-mentioned range, for the following reason. When the alumina content becomes insufficient as a result of excessive increase in a sintering aid component, the amount of the liquid phase generated during firing increases; as a result, crystal grains of a sintered body grow excessively. A ceramic microstructure whose sintering aid component content is high and which contains excessively grown crystal grains is low in hardness and thus exhibits low grinding resistance in the course of finishing the dynamic-pressure gap definition surface by use of a grinding wheel or abrasive grains. Therefore, polishing tends to progress unnecessarily fast, encountering difficulty in attaining the accuracy of a polished surfaced. In order to enhance the machining accuracy of a polished surface, a ceramic must have appropriate hardness. Employing an alumina content of ceramic of at least 90% by mass or limiting the sintering aid component content to not greater than 10% by mass prevents the above-described excessive growth of crystal grains, thereby facilitating machining of the thrust dynamic-pressure gap at such accuracy as to fulfill any one of the requirements (i) to (vi).

When the alumina content becomes excessively high as a result of reducing the content of the sintering aid component, the amount of the liquid phase generated during firing decreases; consequently, growth of crystal grains is restrained, and therefore the average crystal grain size becomes considerably small. As a result, a ceramic exhibits excessively high resistance to polishing or grinding, resulting in significant impairment in machining efficiency.

In view of the foregoing, preferably, the average crystal grain size of alumina ceramic is adjusted to 1–10 µm. The alumina content is preferably 92–98% by mass, more preferably 93–97% by mass. An oxide-type sintering aid component, which forms the grain boundary phase, is contained preferably in an amount of 2–8% by mass, or more preferably in an amount of 3–7% by mass, as reduced to an oxide thereof.

Herein, the size of a crystal grain (or a surface pore) is defined in the following manner. As shown in FIG. 6, various parallel lines circumscribe a crystal grain (or a surface pore) which is observed on the microstructure of the dynamic-pressure gap definition surface by means of SEM, an optical microscope, or like equipment. The size of the surface pore is represented by an average value of the minimum distance dmin between such parallel lines and the maximum distance dmax between such parallel lines (i.e., d=(dmin+dmax)/2).

The oxide-type sintering aid component can be, for example, an oxide whose cation component is Li, Na, K, Mg, Ca, Sr, Ba, Sc, Y, La, Ce, Pr, Nd, Sm, Eu, Gd, Tb, Dy, Ho, Er, Tm, Yb, Lu, or Si. In this case, alumina ceramic can contain one or more cation components selected from the group consisting of the above-mentioned cation components, in a total amount of 0.5–10% by mass (preferably 2–8% by mass, more preferably 3–7% by mass) as reduced to an oxide(s) thereof.

Among these cation components, the Si component enhances strength by forming the framework of the grain boundary phase and improving fluidity of the liquid phase. Three components Li, Na, and K, which are alkali metals, lower the melting point of the liquid phase generated in the course of firing and thus improve fluidity of the liquid phase to thereby accelerate densification of a sintered body. Among the three components, Na is inexpensive; and Na which is originally present as an impurity in an ordinary alumina material powder produced by the Bayer method can be used as a sintering aid. These three components are reduced to respective oxides thereof as represented by the formula $M_2O$ (where M is a cation metal element).

Four components Mg, Ca, Sr, and Ba, which are alkali earth metals, also lower the melting point of the liquid phase generated in the course of firing and are ranked after alkali metals in terms of the degree of effect obtained. These elements which are incorporated into the grain boundary phase enhance the strength of the grain boundary phase. As a result, the strength and wear resistance of the sintered body as a whole including the dynamic-pressure gap definition surface (the thrust and/or radial dynamic-pressure gap definition surface, particularly the thrust dynamic-pressure gap definition surface; applicable to the description below) are enhanced. The effect is particularly marked when Ca is used. These four components are reduced to respective oxides thereof as represented by the formula MO (where M is a cation metal element).

Components Sc, Y, La, Ce, Pr, Nd, Sm, Eu, Gd, Th, Dy, Ho, Er, Tm, Yb, and Lu, which are rare earth metals, accelerate crystallization of the grain boundary phase to thereby enhance the strength of the grain boundary phase. As a result, the strength and wear resistance of the sintered body as a whole including the dynamic-pressure gap definition surface are enhanced. The effect is particularly marked when Ce is used. Among these components, Ce is reduced to an oxide thereof as represented by the formula $MO_2$, and remaining components are reduced to respective oxides thereof as represented by the formula $M_2O_3$ (where M is a cation metal element).

Next, preferably, the apparent density of alumina ceramic is 3.5–3.9 g/cm$^3$. Adjustment of the density of alumina ceramic to a relatively high value of 3.5–3.9 g/cm$^3$ improves the absolute value of strength and wear resistance of alumina ceramic, which is used to form the dynamic-pressure gap definition surface, and thereby effectively prevents occurrence of wear of the dynamic-pressure gap definition surface at the time of starting and stopping, when two members are prone to come into contact with each other.

An ideally densified alumina ceramic has a density of up to 4.0 g/cm$^3$. However, when alumina ceramic is to be densified to such a complete level by sintering, the sintering must be performed at high temperature, unavoidably involving the growth of crystal grains. As discussed above, the growth of crystal gains may cause difficulty in attaining high accuracy of the dynamic-pressure gap definition surface. However, when the upper limit of the apparent density of alumina ceramic is set to about 3.9 g/cm$^3$, the sintering temperature does not need to be increased much, thereby restraining the growth of crystal grains and thus attaining an accuracy of the dynamic-pressure gap definition surface which fulfills any one of the requirements (i) to (vi). An apparent density of less than 3.5 g/cm$^3$ impairs strength and wear resistance of alumina ceramic, with the potential result that the dynamic-pressure gap definition surface becomes likely to suffer wear at the time of starting or stopping. More preferably, the apparent density of alumina ceramic is adjusted to 3.6–3.8 g/cm$^3$.

The apparent density of alumina ceramic is not only influenced by the condition of densification, but, to some extent, is also influenced by the kind and content of a sintering aid to be added. Relative density (i.e., a value obtained by dividing apparent density by true density estimated from the compositional ratios of alumina and a sintering aid) can be used as an index for specifying the relationship between a densification level and the degree of growth of crystal grains of ceramic. In the present invention, the relative density of alumina ceramic is not less than 90%, preferably 90–98%, more preferably 94–97%.

An alumina ceramic adjusted to the above-described density range can assume a relatively high bending strength of 280–550 MPa. The alumina ceramic can attain a Rockwell hardness of about 92–98 measured at a load of 15N. Further, the alumina ceramic can attain a fracture toughness of about 3–5 MPa·m$^{1/2}$. Attainment of such a range of strength, hardness, or fracture toughness of alumina ceramic can prevent or restrain wear on the dynamic-pressure gap definition surface at the time of starting or stopping and can attain sufficient machining accuracy, with respect to the thrust dynamic-pressure gap, which fulfills the aforementioned requirements (i) to (vi). Notably, bending strength herein refers to 3-point bending strength measured at room temperature according to the method specified in JIS R1601 (1981). Rockwell hardness measured at a load of 15 N refers to hardness measured at room temperature according to the method specified in JIS Z2245 (1992). Fracture toughness refers to that measured according to the IF method specified in JIS R1607 (1990).

Next, studies carried out by the present inventors have revealed that an extremely smooth dynamic-pressure gap definition surface may fail to generate sufficient fluid dynamic-pressure in a dynamic-pressure gap. Insufficient dynamic pressure fails to stably support the axis of rotation, resulting in difficulty in establishing a favorable state of rotation of a dynamic-pressure bearing. Accordingly, formation of surface pores of a certain dimensional range on the dynamic-pressure gap definition surface is effective for stably maintaining generated dynamic pressure at a high level.

Specifically, when pores of large size are present on the dynamic-pressure gap definition surface, turbulence is generated in the fluid layer present between the spindle and the bearing upon rotation of, for example, the spindle, with the result that vibration of the spindle occurs. By contrast, when pores of small size are present on dynamic-pressure gap definition surfaces of ceramic, adhesion easily occurs between the dynamic-pressure gap definition surfaces, with the result that, for example, an attempt to forcibly induce rotation in a high-friction state associated with adhesion is likely to cause occurrence of wear (hereinafter referred to as "adhesion wear") or a like problem. Also, surface pores of excessively small size hardly contribute to generation of dynamic pressure.

The above-mentioned pores are formed on the dynamic-pressure gap definition surface mainly as a result of dropping off of grains in the course of polishing. Thus, the size (diameter) or distribution of crystal grains of alumina ceramic on the dynamic-pressure gap definition surface plays a very important role in formation of surface pores in a favorable state against occurrence of the above-described problems. In the present invention, specifically, a ceramic used to form the dynamic-pressure gap definition surface of a member is adjusted such that constituent crystal grains have an average grain size of 1–7 μm. As a result, the size and amount of surface pores can be realized which are advantageous for stable maintenance of generated fluid dynamic-pressure at high level and effective restraint of a problem, such as adhesion wear or linking, at the time of starting or stopping a dynamic-pressure bearing.

When the ceramic crystal grains have an average grain size of less than 1 μm, the average size of surface pores thus formed becomes too small, and as a result the dynamic-pressure gap definition surface is prone to adhesion wear or linking when the bearing starts or stops rotating. Also, since fluid dynamic-pressure generated in the dynamic-pressure gap tends to become insufficient, rotational runout becomes likely to occur. By contrast, when the ceramic crystal grains have an average grain size in excess of 7 μm, the average size of surface pores thereby formed becomes too large, with the result that excessive turbulence is generated in the dynamic-pressure gap and the axis of rotation is likely to vibrate. More preferably, ceramic crystal grains have an average grain size of 2–5 μm.

In order to realize the above-mentioned advantageous size and amount of surface pores formed on the dynamic-pressure gap definition surface, ceramic crystal grains having a grain size of 2–5 μm preferably occupy an area percentage of not less than 40% (including 100%). When the area percentage occupied by ceramic crystal grains falling within the above-mentioned dimensional range is less than 40%; for example, when grains having a grain size in excess of the upper limit of the above-mentioned dimensional range increase, dropping off of grains becomes unlikely to occur, with the result that the area percentage occupied by surface pores contributing effectively to generation of dynamic pressure may become insufficient. By contrast, when grains having a grain size less than the lower limit of the above-mentioned dimensional range increase, the average size of surface pores thereby formed tends to decrease. Either case may be disadvantageous in terms of generation of sufficient dynamic pressure.

Alumina ceramic is made by sintering a mixture of an alumina powder and a sintering aid powder. As shown in FIG. 9, the alumina ceramic has a microstructure such that crystal grains, which contain a predominant amount of alumina and form a main phase, are joined together by a grain boundary phase derived from the sintering aid. Dropping off of crystal grains in the course of polishing is considered to occur mainly through fracture of the grain boundary phase. As a result of crystal grains dropping off, spaces which have been occupied by the crystal grains open on the dynamic-pressure gap definition surface to thereby become pores. It is considered that crystal grains are likely to drop off in a portion of the grain boundary phase where the bonding force is relatively weak, such as a portion of the grain boundary phase where the thickness of the grain boundary phase is decreased, a portion of the grain boundary phase where the grain boundary phase is lacking due to the presence of an internal cavity or the like, or a portion of the grain boundary phase where the strength of the grain boundary phase is lacking due to, for example, the presence of a crack derived from component segregation, thermal stress, or a like cause. Notably, in the present invention, unless otherwise specified, the term "predominant" used in relation to content means that a substance in question is contained in an amount of not less than 50% by mass (the terms "predominantly" and "mainly" have the same meaning).

For example, when a single crystal grain drops off, a pore whose shape and size correspond to those of the crystal grain is formed as represented by pore $V_1$ in FIG. 10(a) (in the figure, white grains represent remaining grains, whereas black grains represent grains which have dropped off). When a plurality of crystal grains drop off, a pore as represented by $V_2$ is formed. As shown in FIG. 10(b), the microstructure of ceramic is usually such that crystal grains of various sizes are mixedly present. Thus, when a large crystal grain is surrounded by a plurality of small crystal grains, dropping off of a series of the small crystal grains may cause dropping off of the central large crystal grain. In these cases, a pore thus formed naturally becomes greater in size than the individual crystal grains which have dropped off.

When the microstructure of alumina ceramic is isometric; i.e., the shape anisotropy of individual crystal grains is low, and a portion of the grain boundary phase where a bonding force is weakened spreads to a certain extent, the form of dropping off as represented by $V_2$ tends to occur at higher frequency upon application of a polishing force on a plurality of crystal grains from a grinding wheel or abrasive grains. In this case, the average size of surface pores thus formed becomes greater than the average grain size of crystal grains adjusted to a grain size of 1–7 μm. Surface pores are formed on the dynamic-pressure gap definition surface in an isotropically scattered fashion, rather than in a fashion scattered in the polishing direction. As a result of surface pores having an average size greater than the average grain size of crystal grains, dynamic pressure thus generated can be increased further, thereby realizing stabler rotation of the bearing.

In production of alumina ceramic, preferably, an alumina powder used as a starting material has an average particle size of 1–5 μm. When an alumina powder whose average particle size falls outside the range is used, crystal grains of an obtained sintered body may fail to have an average grain size falling within the previously described preferable range. The average particle size of a powder can be measured by use of a laser diffraction granulometer.

Preferably, the firing temperature falls within a range of 1400° C. to 1700° C. When the firing temperature is lower than 1400° C., a sintered body encounters difficulty in undergoing densification, resulting in a failure to assume sufficient strength or wear resistance. By contrast, when the firing temperature is in excess of 1700° C., excessive grain growth occurs, and consequently crystal grains of an obtained sintered body may fail to assume an average grain size that falls within the previously described preferable range. Also, a sintered body is prone to suffer deformation or a like problem, with the result that dimensional accuracy may be impaired.

Preferably, surface pores present on the dynamic-pressure gap definition surface formed of a ceramic have an average size of 2–20 μm. By active formation of surface pores having an average size of 2–20 μm, the generated fluid dynamic-pressure can be maintained stably at a high level. Further, in the case of a thrust dynamic-pressure gap, the occurrence of linking can be prevented.

When the average size of surface pores is in excess of 20 μm, excessive turbulence is generated in the dynamic-pressure gap, with the result that the axis of rotation is likely to undergo vibration. By contrast, when the average size of surface pores is less than 2 μm, the dynamic-pressure gap definition surface (the thrust dynamic-pressure gap definition surface; this applies to the description below) is prone to suffer adhesion wear or linking when the bearing starts or stops rotating. Also, since fluid dynamic-pressure generated in the dynamic-pressure gap tends to become insufficient, rotational runout becomes likely to occur. More preferably, the average size of surface pores is 5–15 μm.

Surface pores having a size of not greater than 2 μm cannot contribute much to generation of dynamic pressure. By contrast, when surface pores having a size in excess of 20 μm are present in excessive amount, vibration or a like problem is likely to occur. That is, in order to effectively generate dynamic pressure and to realize stable rotation, the size of surface pores is preferably 2–20 μm. In order to effectively restrain seize-up or linking of the dynamic-pressure gap definition surface at the time of starting or stopping rotation and to increase fluid dynamic-pressure generated in the dynamic-pressure gap, surface pores whose size falls within the above-described range preferably occupy an area percentage of not less than 15%, more preferably not less than 20%, on the dynamic-pressure gap definition surface. In view of effective restraint of occurrence of vibration or a like problem, the area percentage is preferably not greater than 60%, more preferably not greater than 40%.

More preferably, in order to effectively contribute to generation of dynamic pressure and to realize stable rotation, the surface pores have a size of 2–20 μm, and surface pores having a size falling within the dimensional range occupy an area percentage of 10–60% on the dynamic-pressure gap definition surface.

Herein, the term "area percentage of surface pores" means a value obtained by dividing the total area of pores observed on the dynamic-pressure gap definition surface by the area of the dynamic-pressure gap definition surface. When known dynamic-pressure grooves are formed on the dynamic-pressure gap definition surface, the area of an effective dynamic-pressure gap definition region after exclusion of the dynamic-pressure grooves from the dynamic-pressure gap definition surface is used for calculation of the area percentage of surface pores. The area percentage is measured by observing the effective dynamic-pressure gap definition region using magnifying observation means, such as an optical microscope; determining a square measurement region measuring 300 μm×300 μm within the field of observation; and dividing the total area of surface pores observed within the measurement region by the area of the measurement region. Preferably, in order to improve measurement accuracy, five or more measurement regions are arbitrarily determined within a single effective dynamic-pressure gap definition region, and the area percentage of surface pores is obtained by averaging the area percentage values of surface pores of the measurement regions.

Preferably, the dynamic-pressure gap definition surface is free, to the greatest possible extent, from surface pores having a size in excess of 20 μm, since such surface pores are likely to cause occurrence of vibration or a like problem. Specifically, surface pores having a size in excess of 20 μm occupy an area percentage of not greater than 10%, preferably not greater than 5%, on the dynamic-pressure gap definition surface. In view of prevention of vibration, preferably, the maximum size of surface pores present on the dynamic-pressure gap definition surface is not greater than 100 μm; i.e., surface pores having a size in excess of 100 μm are not present.

The first member and the second member, which define a dynamic-pressure gap therebetween, can be formed entirely of alumina ceramic (hereinafter also referred to as "ceramic"). Preferably, the ceramic, which is used to form the members, is a densely sintered body whose microstructure is such that few pores are formed internally, whereas pores are formed in a relatively large amount on the dynamic-pressure gap definition surface, in view of increase of dynamic pressure to be generated, effective prevention of adhesion wear or linking, and enhancement of strength and wear resistance. Specifically, preferably, pores having a size of 2–20 μm present in the ceramic sintered body are localized mainly on the dynamic-pressure gap definition surface in the form of surface pores. Such a microstructure is efficiently attained by the previously described method, in which ceramic crystal grains are caused to drop off to thereby form surface pores in the course of finishing the dynamic-pressure gap definition surface.

Dynamic-pressure grooves may be formed on the dynamic-pressure gap definition surface. For example, formation of known dynamic-pressure grooves on the outer circumferential surface, which serves as the radial dynamic-pressure gap definition surface, of a spindle can realize far smoother rotation. As shown in FIG. 2(a), a plurality of dynamic-pressure grooves can be formed on the outer circumferential surface of the spindle (on the radial dynamic-pressure gap definition surface) while being arranged at predetermined intervals along the circumferential direction. In the embodiment of FIG. 2(a), linear grooves are arrayed while being inclined at a certain angle with respect to a generatrix of the outer circumferential surface of the spindle. However, dynamic-pressure grooves can be used in any other known form can be used. For example, dynamic-pressure grooves can be used in a so-called herringbone form. Specifically, angle (boomerang-like) grooves are formed on the outer circumferential surface at predetermined intervals along the entire circumference such that tips of the grooves are located on a circumferential reference line. Also, as shown in FIG. 2(b), dynamic-pressure grooves may be formed on the surface of a thrust plate (on the thrust dynamic-pressure gap definition surface). In FIG. 2(b), a plurality of curved grooves are formed on the surface of the thrust plate while being arranged at predetermined intervals in the circumferential direction of the thrust plate, which grooves are curved such that the distance between the center of the thrust plate and a point on each groove reduces gradually toward the inner end of the groove.

The hard disk drive of the present invention has a rotational drive unit subjected to high-speed rotation at a speed of, for example, 8000 rpm or higher (in some cases, even at a speed of 10000–30000 rpm or higher). The present invention enables stable maintenance of generated fluid dynamic-pressure at a high level to thereby effectively reduce vibration or the like.

Alumina ceramic can be mixed with zirconia ceramic to obtain a composite ceramic material having high toughness. A product of such a composite ceramic material is formed in the following manner. A ceramic powder which contains either alumina or zirconia as a ceramic component of the highest content and the other as a ceramic component of the second highest content is formed into a green body, which is then fired to become a composite ceramic product. Preferably, zirconia ceramic is contained in an amount of 5–60% by volume based on the amount of alumina ceramic.

The composite ceramic material may contain alumina ceramic as a matrix and an electrically conductive, inorganic compound phase whose metal cation component is at least one of Ti, Zr, Nb, Ta, and W. A product of such a composite ceramic material is formed in the following manner. A material powder for forming a matrix ceramic is mixed with a material powder for forming the electrically conductive, inorganic compound phase. The resulting mixed powder is formed into a green body, which is then fired to become a composite ceramic product. The electrically conductive, inorganic compound phase contained in a ceramic product imparts electrical conductivity to the ceramic product and thus enables the ceramic product to undergo electric discharge machining, such as wire-cut electric discharge machining. Imparting electrical conductivity also yields an antistatic effect.

The electrically conductive, inorganic compound can assume the form of at least one of a metal nitride, a metal carbide, a metal boride, and a metal carbonitride which contain, as a metal cation component, at least one of Ti, Zr, Nb, and Ta, as well as tungsten carbide. Specific examples of the electrically conductive, inorganic compound include titanium nitride, titanium carbide, titanium boride, tungsten carbide, zirconium nitride, titanium carbonitride, and niobium carbide. Preferably, the composite ceramic material contains the electrically conductive, inorganic compound phase in an amount of 20–60% by volume in order to attain sufficient enhancement of electrical conductivity while maintaining strength and fracture toughness. When the above-described composite ceramic is to be used, the previously described alumina content or sintering aid content is not of composite ceramic, but of alumina ceramic serving as a matrix.

BRIEF DESCRIPTION OF THE DRAWINGS

FIG. 8 is an explanatory view showing various modified examples of the bearing member.

DESCRIPTION OF REFERENCE NUMERALS

Figure 1:
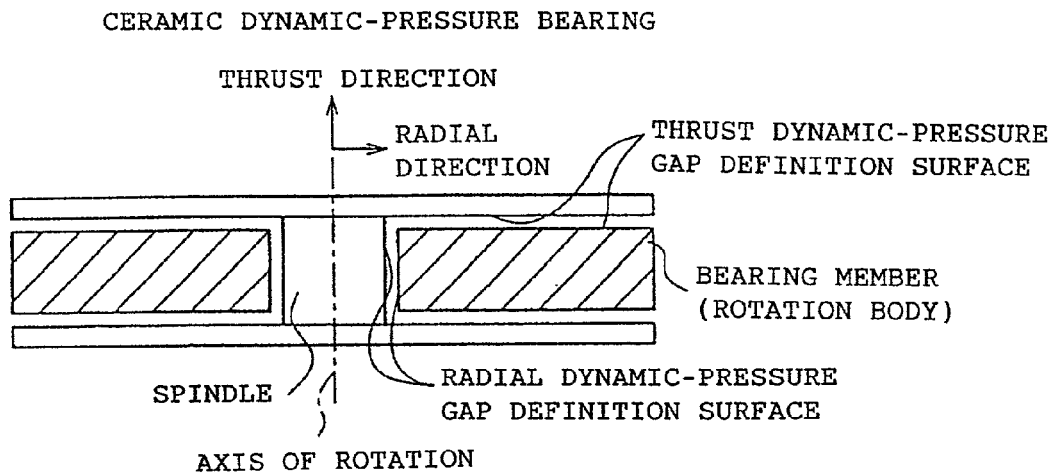
FIG. 1 is a schematic sectional view showing a structural example of a ceramic dynamic-pressure bearing of the present invention.

1: hard disk drive
3: ceramic dynamic-pressure bearing
14: spindle
15: bearing member
15a: reception hole
17: radial dynamic-pressure gap
18: thrust dynamic-pressure gap
21, 23: thrust plate
M: dynamic-pressure gap definition surface
M1, M2: radial dynamic-pressure gap definition surface
M3–M6: thrust dynamic-pressure gap definition surface

DETAILED DESCRIPTION OF THE PREFERRED EMBODIMENTS

Embodiments of the present invention will next be described with reference to the drawings. However, the present invention should not be construed as being limited thereto.

Figure 3:
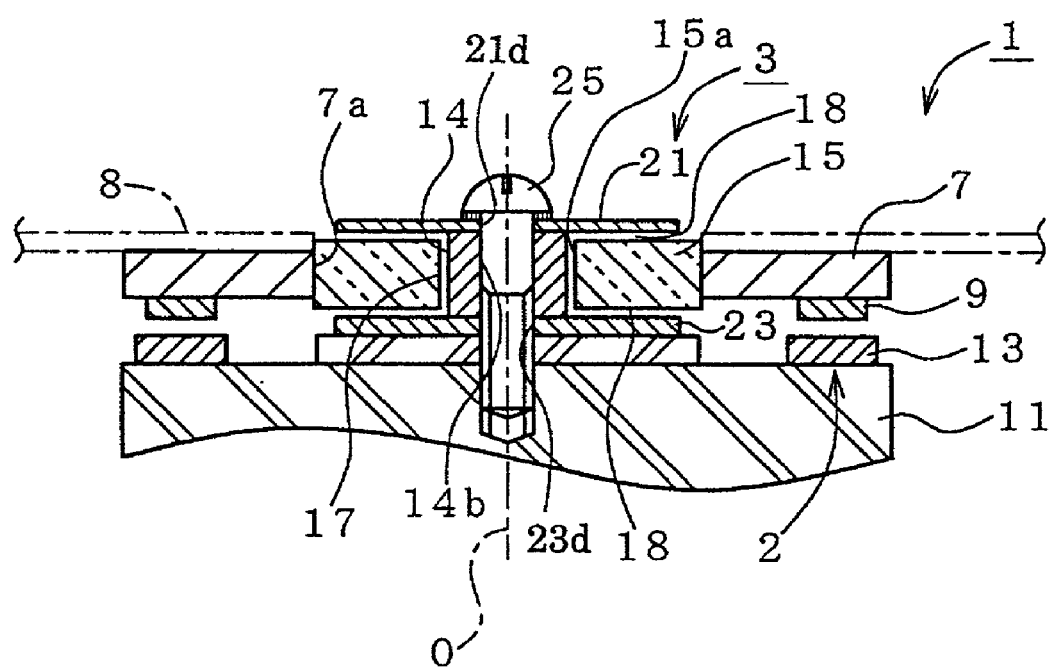
FIG. 3 is a sectional front view showing an example of a hard disk drive of the present invention.

FIG. 3 shows a hard disk drive 1 according to an embodiment of the present invention. The hard disk drive 1 uses a motor having a dynamic-pressure bearing in order to rotate a magnetic disk 8, which motor is equipped with a ceramic dynamic-pressure bearing 3 (hereinafter also referred to as a dynamic-pressure bearing) using air as a dynamic-pressure generation fluid. In the motor having a dynamic-pressure bearing, in order to rotate a cylindrical bearing member 15 (a rotation body), a permanent magnet 9 is mounted on a support member 7, which is integrally attached to the outer circumferential surface of the bearing member 15, whereas a coil 13 is mounted on a base 11 and faces the permanent magnet 9. The permanent magnet 9 and the coil 13 may be interchanged.

Figure 4:
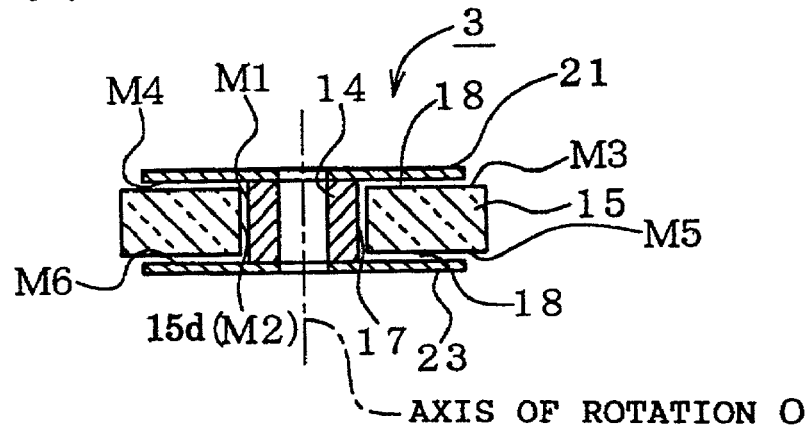
FIGS. 4(a) ad 4(b) are a sectional front view and exploded perspective view showing the ceramic dynamic-pressure bearing of the motor unit of FIG. 3.
Figure 4:
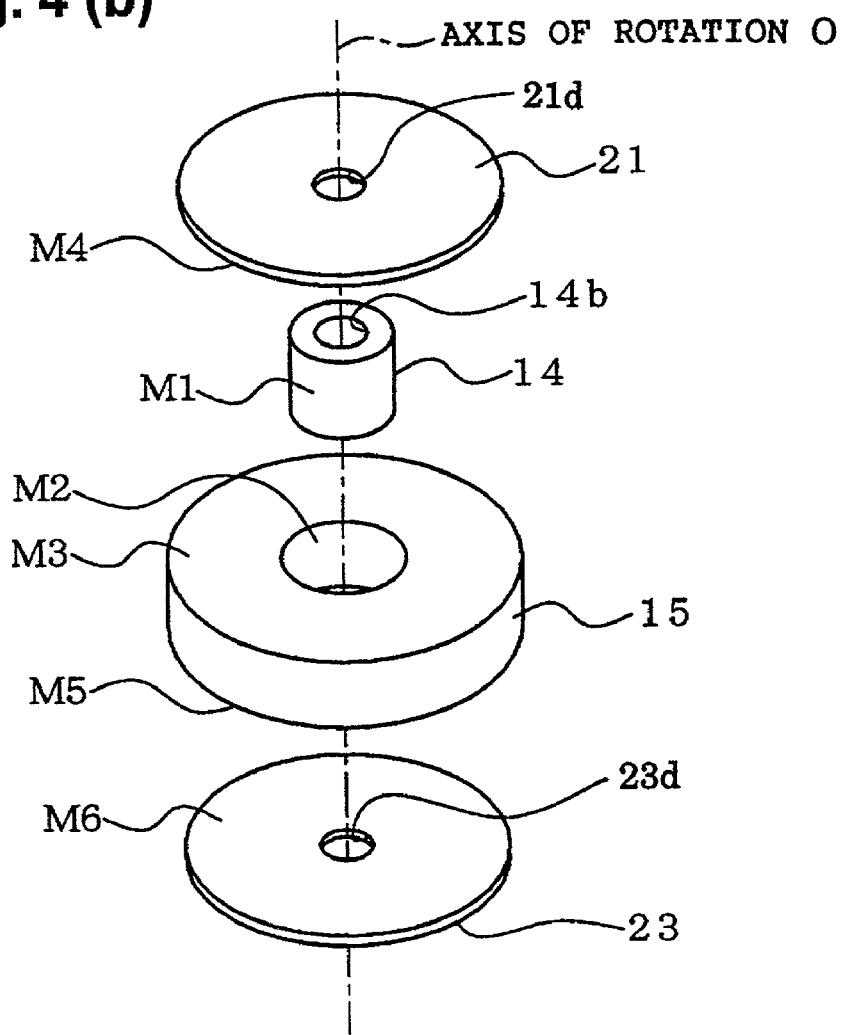

The ceramic dynamic-pressure bearing 3 is configured such that a cylindrical spindle (e.g., inner diameter: 5 mm, outer diameter: 15 mm, axial length: 8 mm) 14 is rotatably inserted into a reception hole 15a of a cylindrical bearing member (e.g., inner diameter: 15 mm, outer diameter: 25 mm, axial length: 8 mm) 15. As shown in FIG. 4, an inner circumferential surface M2 of the reception hole 15d and an outer circumferential surface M1 of the spindle 14 serve as cylindrical radial dynamic-pressure gap definition surfaces. A radial dynamic-pressure gap 17 filled with air is formed between the inner circumferential surface M2 and the outer circumferential surface M1 so as to generate dynamic pressure that is effective in the radial direction relative to an axis of rotation o. The radial dynamic-pressure gap 17 has a size of, for example, about 5 μm. As designated herein, the spindle 14 is the first member, and the bearing member 15 is the second member.

Disk-like thrust plates (e.g., inner diameter: 5 mm, outer diameter: 25 mm, thickness: 2 mm) 21 and 23 are coaxially attached to the corresponding opposite end faces of the spindle 14. Inner plate faces M4 and M6 of the thrust plates 21 and 23 face opposite end faces M3 and M5 of the bearing member 15 serving as a rotation body. As shown in FIG. 3, the thrust plates 21 and 23 are placed on the corresponding end faces of the spindle 14 such that center holes 21d and 23d of the thrust plates 21 and 23 are aligned with a center hole 14b of the spindle 14. A bolt 25 is inserted into the center hole 14b and is screwed into the base 11 to thereby fix the thrust plates 21 and 23 on the end faces of the spindle 14.

As shown in FIG. 4, the plate faces M4 and M6 of the thrust plates 21 and 23 and the opposite end faces M3 and M5 of the bearing member 15 serve as the thrust dynamic-pressure gap definition surfaces, and thrust dynamic-pressure gaps 18 filled with air are formed therebetween so as to generate dynamic pressure that is effective in the direction of the axis of rotation o; i.e., in the thrust direction. Each of the thrust dynamic-pressure gaps 18 has a size of, for example, about 6 μm.

Each of the spindle 14, the bearing member 15, and the thrust plates 21 and 23 is entirely formed of alumina ceramic, whose alumina content is 90–99.5% by mass, preferably 92–98% by mass and which contains, as balance, an oxide-type sintering aid component and unavoidable impurities.

In the present embodiment, opposite end faces (thrust dynamic-pressure gap definition surfaces) 15a and 15b of the bearing member 15 as viewed along the axis are set to have a flatness of not greater than 3 μm (e.g. 1.5 μm). A lower end face (a thrust dynamic-pressure gap definition surface) 21a of the upper thrust plate 21 and an upper end face (a thrust dynamic-pressure gap definition surface) 23b of the lower thrust plate 23 are set to have a flatness of not greater than 3 μm (e.g. 1.0 μm).

Figure 7:
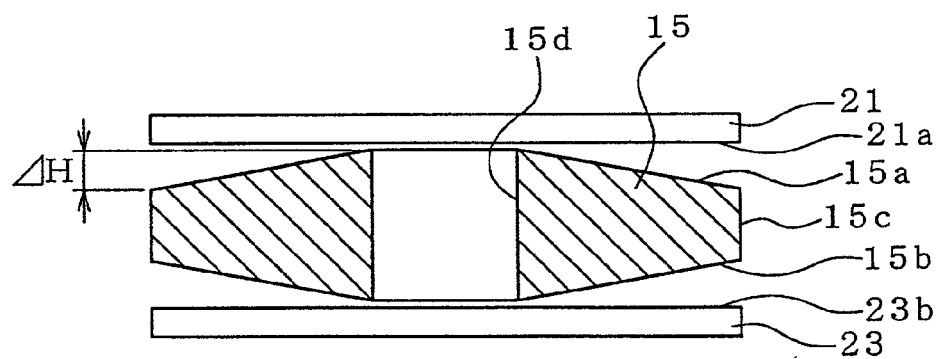
FIG. 7 is an explanatory view showing the bearing member of FIG. 3 in an exaggerated manner.
Figure 9:
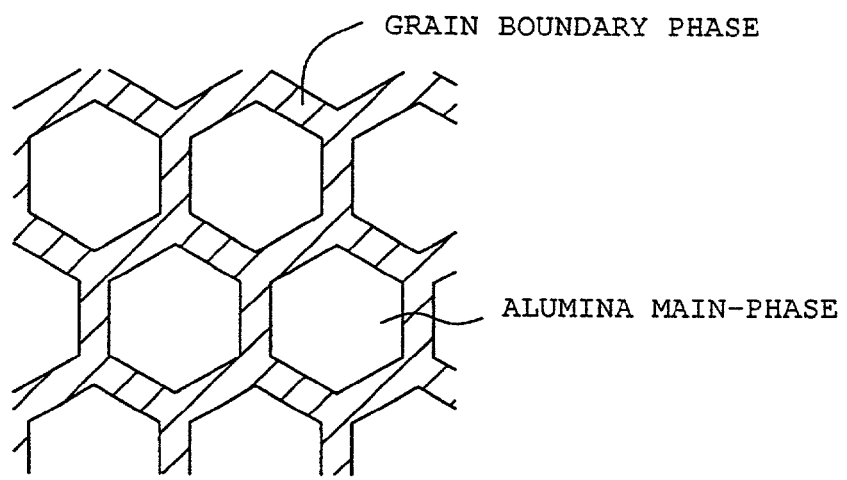
FIG. 9 is a schematic view showing the microstructure of an alumina ceramic sintered body.
Figure 10:
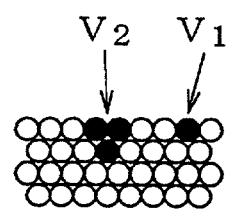
FIGS. 10(a) and 10(b) are schematic views showing various forms of a pore formed by dropping off of a ceramic crystal grain(s).
Figure 10:
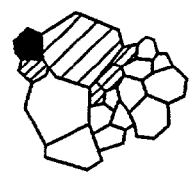

Further, in the present embodiment, as shown in FIG. 7 such that a feature is exaggerated, the upper and lower thrust dynamic-pressure gap definition surfaces 15a and 15b are configured such that an inner circumferential portion 15d, which faces a through hole, is higher in an amount greater than 0 μm and not greater than 2.5 □m (e.g., 1.0 μm) than an outermost circumferential portion 15c. That is, each of the end faces is smoothly crowned such that the inner circumferential portion 15d projects by an amount of height difference ΔH (accordingly, a total of 2ΔH) with respect to the outermost circumferential portion 15c. By contrast, the two thrust plates 21 and 23 are flat plates; i.e., no height difference is present between an inner circumferential portion and an outermost circumferential portion.

Figure 5:
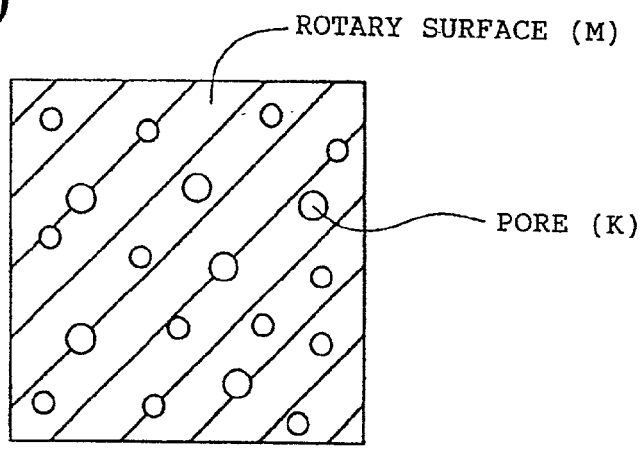
FIG. 5(a) is a schematic view showing a dynamic-pressure gap definition surface having surface pores formed thereon and FIGS. 5(b)–5(d) are explanatory views showing how surface pores are formed as a result of dropping off of grains during polishing.
Figure 5:
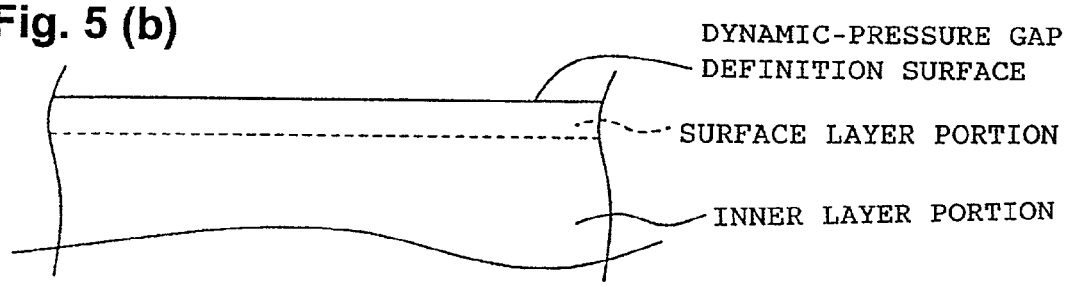
Figure 5:
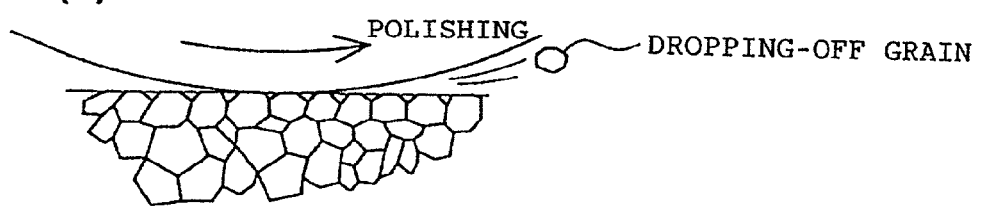
Figure 5:
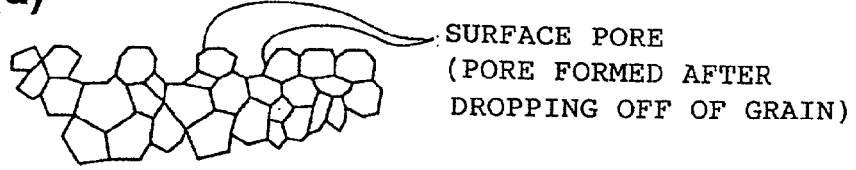
Figure 6:
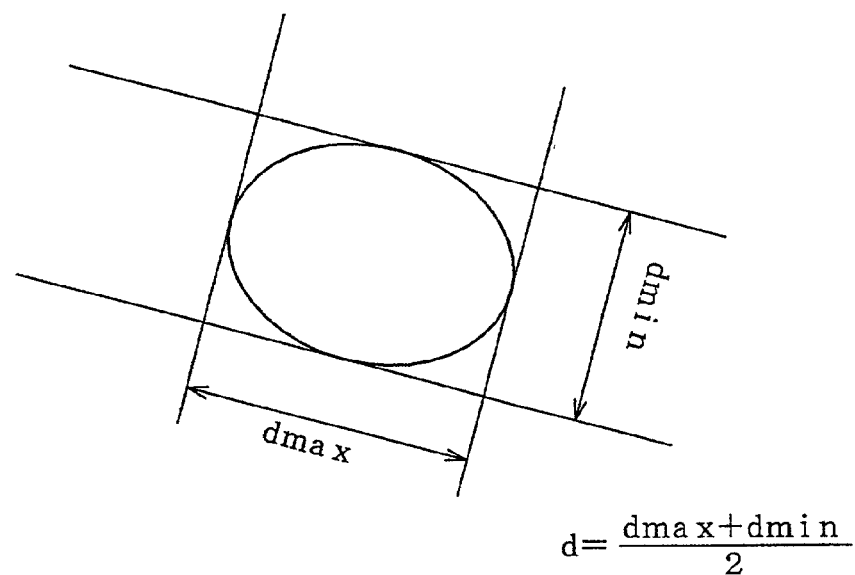
FIG. 6 is an explanatory view showing the definition of the size of a pore (or a crystal grain).

Alumina ceramic used to form the members has an apparent density of 3.5–3.9 g/cm$^3$, preferably 3.6–3.8 g/cm$^3$. The relative density of the alumina ceramic is 90–98%, preferably 94–97%. Ceramic crystal grains in the dynamic-pressure gap definition surfaces M1–M6 have an average grain size of 1–10 μm, preferably 1–7 μm. As shown in FIG. 5, a number of surface pores K are formed on the dynamic-pressure gap definition surfaces M1–M6 and have an average size of 2–20 μm. When surface pores having an average size of 2–20 μm occupy an average area percentage of 10–60%, preferably 20–50%, on the dynamic-pressure gap definition surface, occurrence of the above-mentioned adhesion wear or linking becomes more unlikely, and fluid dynamic-pressure generated in the dynamic-pressure gap can be increased. In this case, the size and the area percentage of surface pores K may be adjusted to the above-mentioned respective ranges with respect to at least one of the dynamic-pressure gap definition surfaces M1 to M6 (e.g., only either one of the radial dynamic-pressure gap definition surfaces M1 and M2, only either one of the thrust dynamic-pressure gap definition surfaces M3 and M4, or only either one of the thrust dynamic-pressure gap definition surfaces M5 and M6). Preferably, in order to enhance the effects, the size and the area percentage of surface pores K are adjusted to the above-mentioned respective ranges with respect to as many dynamic-pressure gap definition surfaces as possible, ideally all of the dynamic-pressure gap definition surfaces M1 to M6.

In order to increase dynamic pressure to be generated, known dynamic-pressure grooves as shown in FIG. 2(a) can be formed on at least either one of the radial dynamic-pressure gap definition surfaces M1 and M2 (e.g., on the surface M1 of the spindle 14). Also, known dynamic-pressure grooves as shown in FIG. 2(b) can be formed on at least one of the thrust dynamic-pressure gap definition surfaces M3 to M6 (e.g., on the surfaces M4 and M6 of the thrust plates 21 and 23).

A method for manufacturing the above-described ceramic dynamic-pressure bearing 3 will next be described.

The ceramic members; i.e., the spindle 14, the bearing member 15, and the thrust plates 21 and 23 can be manufactured by a known sintering process. Specifically, an alumina material powder having an average particle size of 1–5 μm is mixed with an oxide powder(s), such as MgO, CaO, CeO$_2$, SiO$_2$, or Na$_2$O, serving as a sintering aid powder(s) to thereby obtain a forming material powder. The forming material powder is press-formed into a green body in a corresponding shape by a known forming process, such as a die pressing process or a cold isostatic pressing process. The green body is fired at a temperature of 1400–1700° C. to thereby obtain a sintered body.

This sintered body is polished at a required surface including a surface which is to become the dynamic-pressure gap definition surface so as to have predetermined dimensions. Specifically, the inner circumferential surface of the reception hole 15a of the bearing member 15, the opposite end faces of the bearing member 15, the outer circumferential surface of the spindle 14, and the faces of the thrust plates 21 and 23 which will face the corresponding end faces of the bearing member 15 are, for example, high-speed polished at a circumferential speed of 1000–1200 m/s by use of a grinding diamond wheel having an abrasive No. of #100-#200 and are then finished by buffing using a diamond abrasive #4000-#6000.

As shown in FIG. 5(c), when the dynamic-pressure gap definition surface is finished by polishing, ceramic crystal grains drop off in the course of polishing, thereby forming surface pores. The average size, the size distribution, and the area percentage of surface pores to be formed can be adjusted by adjusting the average grain size and the grain size distribution of ceramic crystal grains of the sintered body, the grain size (abrasive No.) of abrasive grains of a grinding wheel or abrasive grains for lapping use, and polishing conditions, such as polishing period of time. Since the composition and distribution of the grain boundary phase derived from a sintering aid may influence proneness to dropping off of ceramic crystal grains in the course of polishing, this must also be considered in determining the polishing conditions and must be adjusted as adequate so as to favorably form surface pores.

A ceramic member whose dynamic-pressure gap definition surface is finished as described above assumes a microstructure such that pores are formed on the surface of a dense sintered body as a result of dropping of ceramic grains; i.e., a particular microstructure such that, as shown in FIG. 5(b), an inner layer portion is denser than a surface layer portion, where surface pores are present. Accordingly, the presence of surface pores prevents occurrence of adhesion wear or linking and effectively increases dynamic pressure to be generated, and the formation of the dense inner layer portion enhances the strength of the ceramic member. Since a dense microstructure is maintained in a region of the surface layer portion other than surface pores, wear resistance is significantly improved as compared to a porous ceramic sintered body, which is formed without undergoing densification.

Upon completion of polishing of the dynamic-pressure gap definition surfaces M, the aforementioned dynamic-pressure grooves are formed by sand blasting, etching, or a like process, thereby yielding the spindle 14, the bearing member 15, or the thrust plates 21 and 23. Then, as shown in FIG. 3, the support (herein, formed into a disk-like shape having a hole portion 7a into which the bearing member 15 is fitted) 7, the permanent magnet 9, and the coil 13 are mounted by bonding or a like process. Further, the spindle 14, the bearing member 15, and the thrust plates 21 and 23 are assembled by use of the bolt 25, thereby yielding a motor having a dynamic-pressure bearing. Attachment of the magnetic disk 8 onto the support member 7 completes assembly of the hard disk drive 1.

The hard disk drive 1 operates in the following manner. The motor having a dynamic-pressure bearing 2 is configured as an alternating-current induction motor. When electricity is applied to the coil 13, the magnetic disk 8, the bearing member 15, and the support member 7 are rotated unitarily, whereas the spindle 14 serves as a fixed spindle. The magnetic disk 8 is rotated at a maximum rotational speed of 8000 rpm or higher or at a maximum rotational speed of 10000 rpm or higher or even 30000 rpm or higher (e.g., about 50000 rpm) when higher scanning speed is required. Accordingly, the number of turns of the coil 13, the intensity of an external magnetic field to be generated for excitation use by the permanent magnet 9, rated drive voltage, etc., are determined as appropriate so as to realize the above-mentioned maximum rotational speed, with the load of rotation of the magnetic disk 8 taken into account. Radial dynamic-pressure, which is effective in the radial direction relative to the axis of rotation o, is generated in the radial dynamic-pressure gap 17 formed between the spindle 14 and the bearing member 15, whereas thrust dynamic-pressure is generated in the thrust dynamic-pressure gaps 18 formed between the thrust plates 21 and 23 and the bearing member 15. Thus, the axis of rotation of the magnetic disk 8 is supported in the radial and thrust directions while the members that undergo relative rotation are maintained in a non-contacting state.

According to the present embodiment, when the opposite thrust dynamic-pressure gap definition surfaces 15a and 15b of the bearing member 15 and the thrust dynamic-pressure gap definition surfaces 21a and 23b of the two thrust plates 21 and 23 have a flatness of not greater than 3 μm, an appropriate clearance can be established between the rotary surfaces, which causes generation of dynamic pressure through rotation thereof. Therefore, vibration during rotation is reduced, and ceramic members, such as the bearing member 15 and the thrust plates 21 and 23, are not prone to breakage.

The opposite thrust dynamic-pressure gap definition surfaces 15a and 15b of the bearing member 15 are formed such that the height difference ΔH between the outermost circumferential portion 15c and the inner circumferential portion 15d is greater than 0 μm and not greater than 2.5 μm, thereby restraining occurrence of linking and seize-up at the time of starting and stopping. Therefore, ceramic members, such as the bearing member 15 and the thrust plates 21 and 23, are not prone to breakage.

The above-mentioned flatness and the height difference ΔH (between the inner circumferential portion and the outermost circumferential portion) are related in the following manner. When waviness (e.g., about 0.5 μm) is present on the outermost circumferential portion of the thrust dynamic-pressure gap definition surface, the total value of the waviness of the outermost circumferential portion and the height difference ΔH corresponds to actual flatness.

Next, additional embodiments will be described.

Ceramic dynamic-pressure bearings of other embodiments of the invention can employ ceramic members; i.e., a bearing member and thrust plates, having the following dimensional and structural features in addition to those of Embodiment 1.

a) An embodiment which fulfills only requirement (i). Specifically, as shown in FIG. 8(a), the opposite thrust dynamic-pressure gap definition surfaces of the bearing member are parallel with the corresponding thrust dynamic-pressure gap definition surfaces of the thrust plates, and at least either one of the opposite thrust dynamic-pressure gap definition surfaces of the bearing member has a flatness of not greater than 3 μm. In FIG. 8(a), a portion having a flatness of not greater than 3 μm (in this drawing, the opposite thrust dynamic-pressure definition surfaces) is schematically represented by slashes (this applies to the description below).

b) An embodiment which fulfills only requirement (ii). Specifically, as shown in FIG. 8(b), the opposite thrust dynamic-pressure gap definition surfaces of the bearing member are parallel with the corresponding thrust dynamic-pressure gap definition surfaces of the thrust plates, and the thrust dynamic-pressure gap definition surface of at least either one of the two thrust plates has a flatness of not greater than 3 μm.

c) An embodiment which fulfills only requirement (iii). Specifically, as shown in FIG. 8(c), the opposite thrust dynamic-pressure gap definition surfaces of the bearing member are parallel with the corresponding thrust dynamic-pressure gap definition surfaces of the thrust plates, and at least either one of the opposite thrust dynamic-pressure gap definition surfaces of the bearing member and the corresponding thrust dynamic-pressure gap definition surface of the thrust plate have a total flatness of not greater than 3 μm.

d) An embodiment which fulfills only requirement (iv). Specifically, as shown in FIG. 8(d), flatness is not specified for the thrust dynamic-pressure gap definition surfaces; however, at least either one of the two thrust dynamic-pressure gap definition surfaces of the bearing member is crowned such that an inner circumferential portion thereof projects by an amount greater than 0 μm and not greater than 2.5 μm with respect to an outermost circumferential portion thereof. Notably, FIG. 8(d) is drawn such that the height difference is present with the opposite end faces which serve as the thrust dynamic-pressure gap definition surfaces (this applies to the description below).

e) An embodiment which fulfills only requirement (v). Specifically, as shown in FIG. 8(e), flatness is not specified for the thrust dynamic-pressure gap definition surfaces; however, the thrust dynamic-pressure gap definition surface of at least either one of the two thrust plates is crowned such that an inner circumferential portion thereof projects by an amount greater than 0 μm and not greater than 2.5 μm with respect to an outermost circumferential portion thereof.

f) An embodiment which fulfills only requirement (vi). Specifically, as shown in FIG. 8(f), flatness is not specified for the thrust dynamic-pressure gap definition surfaces, and crowning conditions are not specified for the bearing member and the thrust plates; however, the clearance ΔS between at least either one of the opposite thrust dynamic-pressure gap definition surfaces of the bearing member and the corresponding thrust dynamic-pressure gap definition surface of the thrust plate is greater than 0 μm and not greater than 2.5 μm as measured at outermost circumferential portions of the thrust dynamic-pressure gap definition surfaces at the time when rotation of the dynamic-pressure bearing is stopped. Notably, the clearance ΔS is a clearance between the bearing member and the thrust plate as measured at outermost circumferential portions thereof when the bearing member and the thrust plate are in contact with each other.

Figure 8:
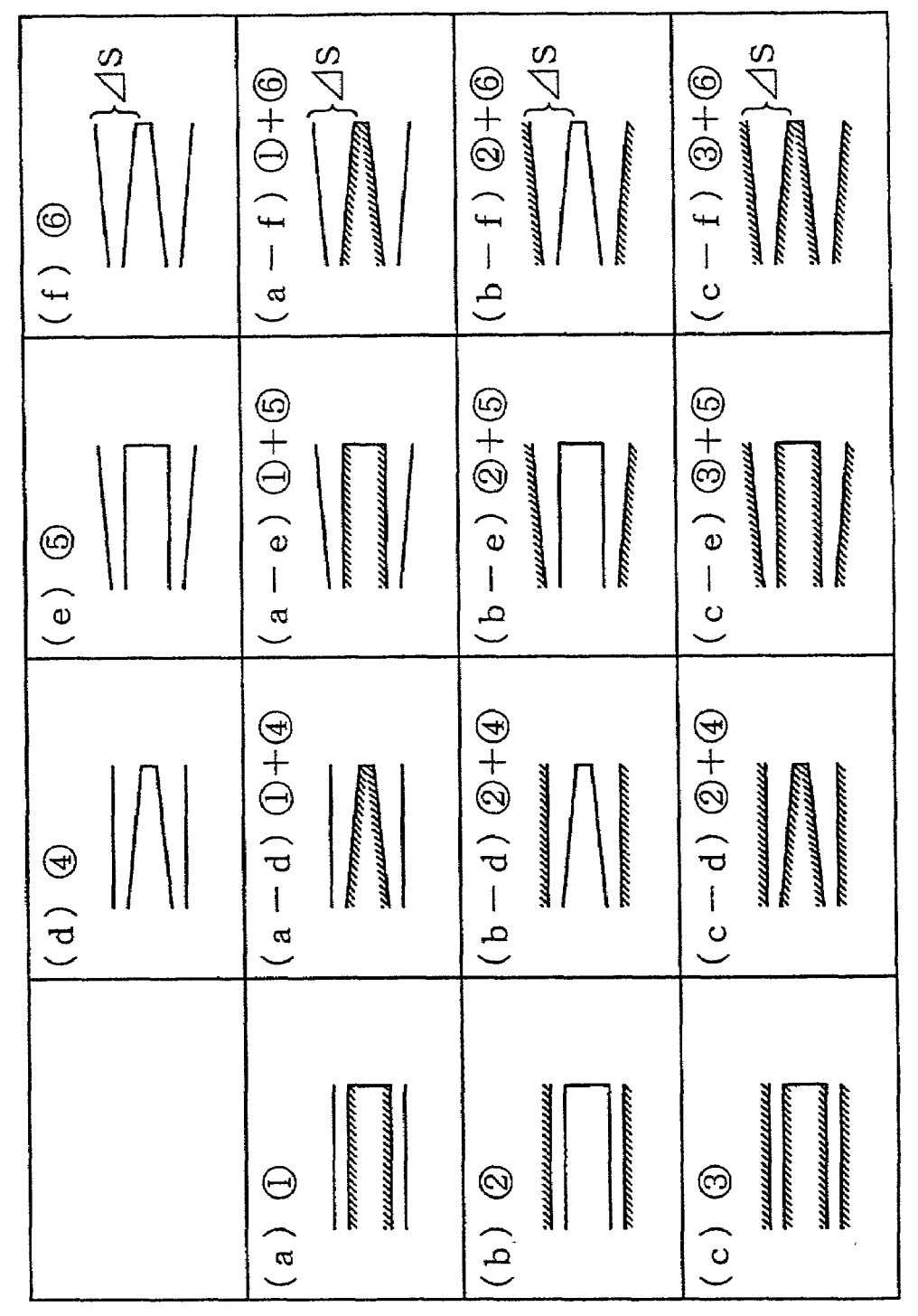

In addition to the above-described embodiments a)–f), these embodiments can be combined to implement further embodiments. For example, as shown in FIG. 8, combined embodiments of (a–d), (a–e), (a–f), (b–d), (b–e), (b–f), (c–d), (c–e), and (c–f) (which correspond to nine combinations of (i)–(iv), (i)–(v), (i)–(vi), (ii)–(iv), (ii)–(v), (ii)–(vi), (iii)–(iv), (iii)–(v), and (iii)–(vi)) are conceivable.

EXAMPLES

Next, experiments which were conducted in order to confirm the effects of the above-described embodiments will be described by way of example.

Experiment Example 1

For the hard disk drive having the structure shown in FIG. 3, various dynamic-pressure bearing samples were manufactured while (1) flatness and (2) height difference ΔH were modified.

(1) Experiment on Flatness

Check for vibration (measurement during rotation). Vibration was detected by use of a non-contacting laser displacement gauge (capable of sampling 50000 times/sec). The test results are shown in Tables as follows: ⊚highly reduced vibration, ○: reduced vibration, X: disabled.

(2) Experiment on Height Difference (End Face Height) ΔH (Clearance S at Outermost Circumferential Portion)

Check for seize-up (check to see whether seize-up occurs at the time of starting and stopping). The test results are shown in the Tables below as follows: ○: seize-up not observed, Δ: seize-up observed, but minor, X: seize-up observed clearly.

TABLE 1

|  | Flatness of bearing member | Vibration |
|---|---|---|
| Within scope of invention | 1.5 μm | ⊚ |
|  | 3.0 μm | ○ |
| Outside scope of invention | 4.5 μm | X |

Notably, the term "flatness of bearing member" refers to the flatness of the opposite thrust dynamic-pressure gap definition surfaces of the bearing member, and the thrust dynamic-pressure gap definition surfaces of the two thrust plates has a flatness of not greater than 0.1 μm. As seen in Table 1, when the thrust dynamic-pressure gap definition surfaces of the bearing member have a flatness of not greater than 3 μm, vibration is reduced.

TABLE 2

|  | Flatness of thrust plate | Vibration |
| --- | --- | --- |
| Within scope of invention | 1.5 μm | ◉ |
|  | 3.0 μm | ○ |
| Outside scope of invention | 4.5 μm | X |

Notably, the term "flatness of thrust plate" refers to the flatness of the thrust dynamic-pressure gap definition surfaces of the two thrust plates, and the opposite thrust dynamic-pressure gap definition surfaces of the bearing member have a flatness of 0.1 μm. As seen in Table 2, when the thrust dynamic-pressure gap definition surfaces of the thrust plates have a flatness of not greater than 3 μm, vibration is reduced.

TABLE 3

|  | Flatness of bearing member | Flatness of thrust plate | Total flatness | Vibration |
| --- | --- | --- | --- | --- |
| Within scope of invention | 0.5 μm | 0.5 μm | 1.0 μm | ◉ |
|  | 1.0 μm | 1.0 μm | 2.0 μm | ○ |
|  | 1.5 μm | 1.5 μm | 3.0 μm | ○ |
| Outside scope of invention | 2.5 μm | 2.5 m | 5.0 μm | Δ |

As seen in Table 3, when the thrust dynamic-pressure gap definition surfaces of the bearing member and the thrust plate which face each other have a total flatness of not greater than 3 μm, vibration is reduced.

TABLE 4

|  | End face height of bearing member | Adhesion wear | Vibration |
| --- | --- | --- | --- |
| Within scope of invention | −1.5 μm | X | ○ |
|  | 0.0 μm | X | ◉ |
|  | +1.5 μm | ○ | ○ |
|  | +2.5 μm | ○ | ○ |
| Outside scope of invention | +3.5 μm | ○ | X |

Notably, the term "end face height of bearing member" refers to the height difference ΔH between the inner circumferential portion and the outermost circumferential portion of the thrust dynamic-pressure gap definition surface of the bearing member. The sign—means that the inner circumferential portion is lower, so that the thrust dynamic-pressure gap definition surface assumes a concave profile. By contrast, the sign+means that the inner circumferential portion is higher, so that the thrust dynamic-pressure gap definition surface assumes a convex profile. The thrust dynamic-pressure gap definition surface of the bearing member has a waviness of not greater than 0.5 μm as measured at the outermost circumferential portion, and the thrust dynamic-pressure gap definition surface of the thrust plate has a flatness of not greater than 0.1 μm. As seen in Table 4, when the end face height of the bearing member is greater than 0 μm and not greater than 2.5 μm, no seize-up occurs, and vibration is reduced.

TABLE 5

|  | End face height of thrust plate | Adhesion wear | Vibration |
| --- | --- | --- | --- |
| Within scope of invention | −1.5 μm | X | ○ |
|  | 0.0 μm | X | ◉ |
|  | +1.5 μm | ○ | ○ |
|  | +2.5 μm | ○ | ○ |
| Outside scope of invention | +3.5 μm | ○ | X |

Notably, the term "end face height of thrust plate" refers to the height difference ΔH between the inner circumferential portion and the outermost circumferential portion of the thrust dynamic-pressure gap definition surface of the thrust plate. The sign—means that the inner circumferential portion is lower, so that the thrust dynamic-pressure gap definition surface assumes a concave profile. By contrast, the sign + means that the inner circumferential portion is higher, so that the thrust dynamic-pressure gap definition surface assumes a convex profile. The thrust dynamic-pressure gap definition surface of the bearing member has a waviness of not greater than 0.5 μm as measured as the outermost circumferential portion, and the thrust dynamic-pressure gap definition surface of the thrust plate has a flatness of not greater than 0.1 μm. As seen in Table 5, when the end face height of the thrust plate is greater than 0 μm and not greater than 2.5 μm, no seize-up occurs, and vibration is reduced.

TABLE 6

|  | End face height of bearing member (μm) | End face height of thrust plate (μm) | Clearance ΔS at outermost circ. portion (μm) | Adhesion wear | Vibration |
| --- | --- | --- | --- | --- | --- |
| Within scope of invention | −1.0 | −1.5 | −2 | X | ○ |
|  | −1.0 | 0.0 | −1 | X | ○ |
|  | −1.0 | +1.0 | 0 | X | ◉ |
|  | 0.0 | −1.0 | −1 | X | ○ |
|  | 0.0 | 0.0 | 0 | ○ | ◉ |
| Inside scope of invention | 0.0 | +1.0 | +1 | ○ | ◉ |
|  | 0.0 | +1.5 | +1.5 | ○ | ○ |
| Outside scope of invention | +1.0 | −1.0 | 0 | X | ○ |
| Inside scope of invention | +1.0 | 0.0 | +1 | ○ | ◉ |
|  | +1.0 | +1.0 | +2 | ○ | ○ |
|  | +1.0 | +1.5 | +2.5 | ○ | ○ |
|  | +1.5 | 0.0 | +1.5 | ○ | ○ |
|  | +1.5 | +1.0 | +2.5 | ○ | ○ |
| Outside scope of invention | +1.5 | +1.5 | +3 | X | X |

Notably, the minus and plus signs in relation to "end face height of bearing member" and "end face height of thrust plate" are as defined above in relation to Tables 4 and 5. The thrust dynamic-pressure gap definition surfaces of the bearing portion and the thrust plate have a waviness of not greater than 0.5 μm as measured at the outermost circumferential portion. As seen in Table 6, when the clearance between the bearing member and the thrust plate as measured at the outermost circumferential portions of the thrust dynamic-pressure gap definition surfaces is greater than 0 μm and not greater than 2.5 μm, no seize-up occurs, and vibration is reduced. The present invention is not limited to the above-described embodiments, and may be embodied in other specific forms without departing from the scope of the present invention.

For example, Embodiment 1 is described while mentioning alumina as material for the spindle, the bearing member, and the thrust plates. However, zirconia, a mixed material of alumina and zirconia, or silicon nitride may be used.

Experiment Example 2

The bearing member 15, the spindle 14, and the thrust plates 21 and 23 were manufactured in the form of alumina ceramic sintered body in the following manner. Prepared materials were an alumina powder (purity: 99.9%) having an average particle size of 1.8 μm and a sintering aid powder obtained by mixing a CaO powder (average particle size: 4 μm), an MgO powder (average particle size: 4 μm), and an $SiO_2$ powder (average particle size: 4 μm) in the weight ratios 3:1:1. The alumina powder and the sintering aid powder were mixed such that the sintering aid powder is contained in an amount of 0.3–15% by mass, and the alumina powder is contained as balance. Water and an appropriate amount of PVA serving as a binder were added thereto, followed by wet mixing. The resultant mixture was spray-dried, thereby yielding a granulation material powder.

Figure 2:
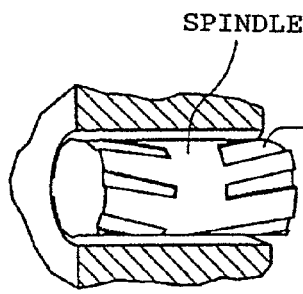
FIGS. 2(a) and 2(b) are explanatory views showing an example of dynamic-pressure grooves formed on a radial dynamic-pressure gap definition surface and an example of dynamic-pressure grooves formed on a thrust dynamic-pressure gap definition surface.
Figure 2:
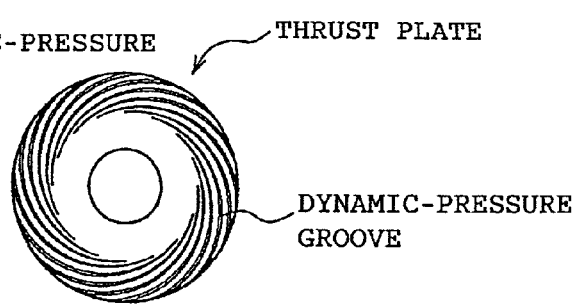

The thus-obtained granulation material powder was die-pressed into green compacts of the members, followed by firing at a temperature of 1400–1700° C. The obtained sintered bodies were machined in the following manner. The inner circumferential surface of the reception hole 15a of the bearing member 15, the opposite end faces (thrust dynamic-pressure gap definition surfaces) of the bearing member 15, the outer circumferential surface of the spindle 14, and the faces (thrust dynamic-pressure gap definition surfaces) of the thrust plates 21 and 23 which will face the corresponding end faces of the bearing member 15 were high-speed polished at a circumferential speed of 1000 m/s by use of a grinding diamond wheel having an abrasive No. of #100-#200 and were then finished through buffing by use of a diamond abrasive #2000-#6000. In this state, the thrust dynamic-pressure gap definition surfaces of the bearing member 15 and those of the thrust plates 21 and 23 were measured for flatness by use of known profile measuring equipment. After the measurement, a relevant dynamic-pressure gap definition surface was subjected to sandblasting while an unnecessary region on the surface was masked, thereby forming dynamic-pressure grooves as shown in FIG. 2.

A polished region of each dynamic-pressure gap definition surface, in which region dynamic-pressure grooves are not formed, was observed through an optical microscope. An image obtained through observation was analyzed by known methods for an average size (an average grain diameter) of the alumina crystal grains. Surface pores were measured for an area percentage occupied by pores having a size of 2–20 μm. The members were measured for apparent density by an Archimedean method and were calculated for relative density by use of the measured apparent density and true density estimated from the compositional ratios of alumina and the sintering aid.

Next, the above-mentioned members were incorporated into a hard disk drive motor having a dynamic-pressure bearing as shown in FIG. 3. The motor was subjected to the following tests.

(i) During continuous rotation at a rotational speed of 30000 rpm, the runout of the bearing member 15 serving as a rotation portion (the maximum deflection of a measurement position on the outer circumferential surface of the bearing member 15 along a direction perpendicular to the axis of rotation) was measured using a laser interference length-measuring machine. Evaluation criteria were as follows: runout less than 0.1 μm: excellent (◎) not less than 0.1 μm and less than 0.2 μm: good (○); not less than 0.2 μm and less than 0.3 μm: acceptable (Δ); in excess of 0.3 μm: not acceptable (X).

(ii) The motor was subjected to 100000 test cycles, each being such that the motor is accelerated from a stop state to a rotational speed of 30000 rpm and is held at that speed for 1 minute, and then the motor is stopped. Evaluation criteria for adhesion wear were as follows: adhesion wear was not observed with the dynamic-pressure gap definition surfaces until the test operation was completed: excellent (◎); adhesion wear was observed slightly when the test operation was completed: good (○); adhesion wear was observed in some degree when the test operation was completed, but no problem arose: acceptable (Δ); significant adhesion wear occurred in the course of the test operation and disabled the test: not acceptable (X). Further, the thrust dynamic-pressure gap definition surfaces of the bearing members 15 were measured for Rockwell hardness at a load of 15 N according to the method specified in JIS Z2245 (1992).

The test results are shown below in Tables 7 and 8.

TABLE 7

| | Alumina content (% by mass) | Average crystal grain size of sintered body | Apparent density of sintered body (g/cm³) | Relative density of sintered body (%) | Rockwell hardness | Area percentage of surface pores of 2–20 μm | Abrasive No. |
|---|---|---|---|---|---|---|---|
| 1* | 85.0 | 10.0 | 3.30 | 83 | 91 | 57 | #6000 |
| 2 | 90.0 | 7.0 | 3.59 | 90 | 94 | 36 | #6000 |
| 3 | 95.0 | 3.0 | 3.72 | 93 | 95 | 23 | #2000 |
| 4 | 95.0 | 3.0 | 3.72 | 93 | 95 | 22 | #3000 |
| 5 | 95.0 | 3.0 | 3.72 | 93 | 95 | 21 | #4000 |
| 6 | 95.0 | 3.0 | 3.72 | 93 | 95 | 21 | #5000 |
| 7 | 95.0 | 3.0 | 3.72 | 93 | 95 | 21 | #6000 |

Samples marked with * fall outside the scope of the invention.

TABLE 8

| | Flatness of thrust plate (μm) | End face flatness of bearing member | Rotational runout | Adhesion wear |
|---|---|---|---|---|
| 1* | 3.5 | 3.5 | X | X |
| 2 | 3.0 | 1.0 | Δ | Δ |

TABLE 8-continued

| | Flatness of thrust plate (μm) | End face flatness of bearing member | Rotational runout | Adhesion wear |
|---|---|---|---|---|
| 3 | 2.0 | 1.0 | ○ | ○ |
| 4 | 1.5 | 1.5 | ○ | ○ |
| 5 | 1.0 | 1.0 | ⊚ | ⊚ |
| 6 | 0.5 | 0.5 | ⊚ | ⊚ |

Samples marked with * fall outside the scope of the invention.

As seen from the above test results, when the alumina content of the alumina ceramic is 90–99.5% by mass, the thrust dynamic-pressure gap definition surfaces of the bearing member 15 and those of the thrust plates 21 and 23 can assume a flatness of not greater than 3 μm, whereby rotational runout and adhesion wear become unlikely to occur. When the thrust dynamic-pressure gap definition surfaces assume a flatness of not greater than 3 μm, the effects of the invention are further enhanced.

This application is based on Japanese Patent Application No. 2001-65591 filed Mar. 8, 2001, the disclosure of which is incorporated herein by reference in its entirety.

What is claimed is:

1. A ceramic dynamic-pressure bearing comprising:
a first member formed of ceramic and having a cylindrical outer surface, a second member formed of ceramic and having a cylindrical reception hole formed therein, the first member being inserted into the reception hole of the second member in such a manner as to be rotatable, relative to the second member, about an axis, and a thrust plate formed of ceramic facing at least one end face of the second member as viewed along the axis of rotation, the end face of the second member and a face of the thrust plate in opposition to the end face serving as thrust dynamic-pressure gap definition surfaces so as to define a thrust dynamic-pressure gap therebetween; and
the ceramic dynamic-pressure bearing satisfies at least one of the conditions (iv) and (v):
(iv) the thrust dynamic-pressure gap definition surface of the second member which faces the thrust plate is crowned such that an inner circumferential portion thereof projects by an amount greater than 0 μm and not greater than 2.5 μm with respect to an outermost circumferential portion thereof; and
(v) the thrust dynamic-pressure gap definition surface of the thrust plate which faces the second member is crowned such that an inner circumferential portion thereof projects by an amount greater than 0 μm and not greater than 2.5 μm with respect to an outermost circumferential portion thereof.

2. The ceramic dynamic-pressure bearing as claimed in claim 1, wherein an inner surface of the reception hole of the second member and an outer circumferential surface of the first member to be received inside the inner surface serve as radial dynamic-pressure gap definition surfaces, which define a radial dynamic-pressure gap therebetween.

3. The ceramic dynamic-pressure bearing as claimed in claim 1, wherein the thrust dynamic-pressure gap definition surface of the thrust plate has a hardness lower than that of the thrust dynamic-pressure gap definition surface of the second member.

4. The ceramic dynamic-pressure bearing as claimed in claim 1, wherein the first member, the second member, and the thrust plate are formed of an alumina ceramic comprising ceramic crystal grains which contains an Al component in an amount of 90–99.5% by mass as reduced to $Al_2O_3$ and an oxide-type sintering aid component in an amount of 0.5–10% by mass as reduced to an oxide thereof.

5. The ceramic dynamic-pressure bearing as claimed in claim 4, wherein the alumina ceramic has an apparent density of 3.5–3.9 $g/cm^3$.

6. The ceramic dynamic-pressure bearing as claimed in claim 4, wherein the alumina ceramic has a relative density of not less than 90%.

7. The ceramic dynamic-pressure bearing as claimed in claim 4, wherein the ceramic crystal grains have an average grain size of 1–7 μm.

8. The ceramic dynamic-pressure bearing as claimed in claim 4, wherein on the dynamic-pressure gap definition surface formed of alumina ceramic, ceramic crystal grains having a grain size of 2–5 μm occupy percentage of not less than 40%.

9. The ceramic dynamic-pressure bearing as claimed in claim 4, wherein the dynamic-pressure gap definition surface formed of alumina ceramic has surface pores having an average size greater than the average grain size of the ceramic crystal grains.

10. The ceramic dynamic-pressure bearing as claimed in claim 4, wherein surface pores present on the dynamic-pressure gap definition surface have an average size of 2–20 μm.

11. The ceramic dynamic-pressure bearing as claimed in claim 4, wherein, on the dynamic-pressure gap definition surface, surface pores having a size of 2–20 μm occupy an area percentage of 10–60%.

12. The ceramic dynamic-pressure bearing as claimed in claim 4, wherein ceramic forming the first member, the second member, and the thrust plate is a dense ceramic sintered body having a relative density of not less than 90%; and pores having a size of 2–20 μm present in the sintered body are localized mainly on the dynamic-pressure gap definition surface in the form of surface pores.

13. The ceramic dynamic-pressure bearing as claimed in claim 12, wherein the surface pores are formed as a result of ceramic crystal grains dropping off in the course of finishing the dynamic-pressure gap definition surface.

14. The ceramic dynamic-pressure bearing as claimed in claim 1, comprising dynamic-pressure grooves formed on at least one of the radial dynamic-pressure gap definition surfaces and the thrust dynamic-pressure gap definition surfaces.

15. The ceramic dynamic-pressure bearing as claimed in claim 1, wherein the ceramic dynamic-pressure bearing satisfies conditions (iv) and (v).

16. The ceramic dynamic-pressure bearing as claimed in claim 1, wherein the thrust dynamic-pressure gap definition surface of the second member which faces the thrust plate has a flatness of not greater than 3 μm.

17. The ceramic dynamic-pressure bearing as claimed in claim 1, wherein the thrust dynamic-pressure gap definition surface of the thrust plate which faces the second member has a flatness of not greater than 3 μm.

18. The ceramic dynamic-pressure bearing as claimed in claim 1, wherein the thrust dynamic-pressure gap definition surface of the second member which faces the thrust plate and the thrust dynamic-pressure gap definition surface of the thrust plate which faces the second member have a total flatness of not greater than 3 μm.

19. A hard disk drive comprising:
a motor including a motor rotation output section having a ceramic dynamic-pressure bearing comprising a first member formed of ceramic and having a cylindrical outer surface, a second member formed of ceramic and having a cylindrical reception hole formed therein, the first member being inserted into the reception hole of the second member in such a manner as to be rotatable, relative to the second member, about an axis, and a thrust plate formed of ceramic facing at least one end face of the second member as viewed along the axis of rotation, the end face of the second member and a face of the thrust plate in opposition to the end face serving as thrust dynamic-pressure gap definition surfaces so as to define a thrust dynamic-pressure gap therebetween; and
a hard disk rotatably mounted on the motor;
the hard disk drive further characterized in that the ceramic dynamic-pressure bearing satisfies at least one of the conditions (iv) and (v):
(iv) the thrust dynamic-pressure gap definition surface of the second member which faces the thrust plate is crowned such that an inner circumferential portion thereof projects by an amount greater than 0 μm and not greater than 2.5 μm with respect to an outermost circumferential portion thereof; and
(v) the thrust dynamic-pressure gap definition surface of the thrust plate which faces the second member is crowned such that an inner circumferential portion thereof projects by an amount greater than 0 μm and not greater than 2.5 μm with respect to an outermost circumferential portion thereof.

20. The hard disk drive as claimed in claim 19, wherein an inner surface of the reception hole of the second member and an outer circumferential surface of the first member to be received inside the inner surface serve as radial dynamic-pressure gap definition surfaces, which define a radial dynamic-pressure gap therebetween.

21. The hard disk drive as claimed in claim 19, wherein the thrust dynamic-pressure gap definition surface of the thrust plate has a hardness lower than that of the thrust dynamic-pressure gap definition surface of the second member.

22. The hard disk drive as claimed in claim 19, wherein the first member, the second member, and the thrust plate are formed of an alumina ceramic comprising ceramic crystal grains which contains an Al component in an amount of 90–99.5% by mass as reduced to $Al_2O_3$ and an oxide-type sintering aid component in an amount of 0.5–10% by mass as reduced to an oxide thereof.

23. The hard disk drive as claimed in claim 22, wherein the alumina ceramic has an apparent density of 3.5–3.9 $g/cm^3$.

24. The hard disk drive as claimed in claim 22, wherein the alumina ceramic has a relative density of not less than 90%.

25. The hard disk drive as claimed in claim 22, wherein the ceramic crystal grains have an average grain size of 1–7 μm.

26. The hard disk drive as claimed in claim 22, wherein, on the dynamic-pressure gap definition surface formed of alumina ceramic, ceramic crystal grains having a grain size of 2–5 μm occupy an area percentage of not less than 40%.

27. The hard disk drive as claimed in claim 22, wherein the dynamic-pressure gap definition surface formed of alumina ceramic has surface pores having an average size greater than the average grain size of the ceramic crystal grains.

28. The hard disk drive as claimed in claim 22, wherein surface pores present on the dynamic-pressure gap definition surface have an average size of 2–20 μm.

29. The hard disk drive as claimed in claim 22, wherein, on the dynamic-pressure gap definition surface, surface pores having a size of 2–20 μm occupy an area percentage of 10–60%.

30. The hard disk drive as claimed in claim 22, wherein ceramic forming the first member, the second member, and the thrust plate is a dense ceramic sintered body having a relative density of not less than 90%; and pores having a size of 2–20 μm present in the sintered body are localized mainly on the dynamic-pressure gap definition surface in the form of surface in the form of surface pores.

31. The hard disk drive as claimed in claim 30, wherein the surface pores are formed as a result of ceramic crystal grains dropping off in the course of finishing the dynamic-pressure gap definition surface.

32. The hard disk drive as claimed in claim 19, comprising dynamic-pressure grooves formed on at least one of the radial dynamic-pressure gap definition surfaces and the thrust dynamic-pressure gap definition surfaces.

33. The hard disk drive as claimed in claim 19, wherein the ceramic dynamic-pressure bearing satisfies conditions (iv) and (v).

34. The hard disk drive as claimed in claim 19, wherein the thrust dynamic-pressure gap definition surface of the second member which faces the thrust plate has a flatness of not greater than 3 μm.

35. The hard disk drive as claimed in claim 19, wherein the thrust dynamic-pressure gap definition surface of the thrust plate which faces the second member has a flatness of not greater than 3 μm.

36. The hard disk drive as claimed in claim 19, wherein the thrust dynamic-pressure gap definition surface of the second member which faces the thrust plate and the thrust dynamic-pressure gap definition surface of the thrust plate which faces the second member have a total flatness of not greater than 3 μm.

37. A ceramic dynamic-pressure bearing comprising:
a first member formed of ceramic and having a cylindrical outer surface, a second member formed of ceramic and having a cylindrical reception hole formed therein, the first member being inserted into the reception hole of the second member in such a manner as to be rotatable, relative to the second member, about an axis, and first and second thrust plates formed of ceramic facing opposing end faces of the second member as viewed along the axis of rotation, the first end face of the second member and a face of the first thrust plate in opposition to the first end face defining a first thrust dynamic-pressure gap therebetween; the second end face of the second member and a face of the second thrust plate in opposition to the first end face defining a second thrust dynamic-pressure gap therebetween; and
the ceramic dynamic-pressure bearing satisfies at least one of conditions (iv), (v) and (vii):
(iv) a thrust dynamic-pressure gap definition surface of the second member which faces either of the first and second thrust plates is crowned such that an inner circumferential portion thereof projects by an amount greater than 0 μm and not greater than 2.5 μm with respect to an outermost circumferential portion thereof;

(v) a thrust dynamic-pressure gap definition surface of either of the first or second thrust plates which faces the second member is crowned such that an inner circumferential portion thereof projects by an amount greater than 0 μm and not greater than 2.5 μm with respect to an outermost circumferential portion thereof; and (vii) a clearance between the mutually facing thrust dynamic-pressure gap definition surfaces of the second member and each of the first and second thrust plates is greater than 0 μm and not greater than 2.5 μm as measured at outermost circumferential portions of the thrust dynamic-pressure gap definition surfaces.

38. A hard disk drive comprising the ceramic dynamic-pressure bearing of claim 37.

39. The ceramic dynamic-pressure bearing as claimed in claim 37, wherein the ceramic dynamic-pressure bearing satisfies conditions (iv), (v) and (vii).

40. The ceramic dynamic-pressure bearing as claimed in claim 37, wherein the thrust dynamic-pressure gap definition surface of the second member which faces either of the first and second thrust plates has a flatness of not greater than 3 μm.

41. The ceramic dynamic-pressure bearing as claimed in claim 37, wherein the thrust dynamic-pressure gap definition surface of either of the first or second thrust plates which faces the second member has a flatness of not greater than 3 μm.

42. The ceramic dynamic-pressure bearing as claimed in claim 37, wherein the thrust dynamic-pressure gap definition surface of the second member which faces either of the first and second thrust plates and a thrust dynamic-pressure gap definition surface of the thrust plate facing the second member have a total flatness of not greater than 3 μm.

* * * * *